United States Patent Office 3,487,453
Patented Dec. 30, 1969

3,487,453
DYEABLE POLYPROPYLENE CONTAINING A POLYETHERESTER
William C. Sheehan, Bartlesville, Okla., assignor to Phillips Petroleum Company, a corporation of Delaware
No Drawing. Filed Mar. 25, 1968, Ser. No. 715,514
Int. Cl. C08g 17/02
U.S. Cl. 260—897   7 Claims

ABSTRACT OF THE DISCLOSURE

Dye receptivity of polypropylene fiber is improved by the addition of 1 to 20 parts by weight per 100 parts of polypropylene of a polyetherester which is the self-condensation product of a hydroxy-carboxylic acid having the formula

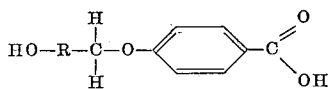

wherein R is a methylene or ethylene divalent radical.

---

This invention relates to a method of improving the dye receptivity of polypropylene. In another aspect, it relates to a polypropylene composition and to fibrous products formed therefrom having improved dyeability.

Normally solid, crystalline polypropylene has proven to be a highly valuable synthetic resin for the manufacture of fiber which can be used to make textile articles such as wearing apparel and carpeting. This polypropylene exhibits excellent wear properties, is not moisture absorbent and is quite inert to attack by chemicals.

One of the difficulties with this polymer, however, is that it has a low capacity for accepting dyes and this has tended to lessen its commercial applications in the textile field.

A number of ways have been suggested to improve the dye receptivity of polypropylene, such as by chemical treatment in order to attach to the polymer molecule certain reactive groups, such as amino radicals or halogen atoms. It has also been suggested in U.S. Patent 3,312,755 to Cappuccio et al. to improve the dyeability of polypropylene by blending therewith various polymeric materials which have good absorption capacity for dyes and are compatible with the polypropylene. Among such dyeable polymeric materials suggested by Cappuccio et al. are the polyester resins obtained by the polycondensation of dicarboxylic acids and glycols, for example, the condensation product of sebacic acid and propylene glycol. It has also been suggested to use a polyester which is a condensation product of ethylene glycol and an aromatic dicarboxylic acid such as terephthalic acid. Polyethylene terephthalate, however, has a melting point of about 265° C., substantially higher than crystalline polypropylene, and therefore requires a relatively high processing temperature. It is generally desirable to have the spinning temperature substantially above the melting temperatures of any of the polymers being spun into fiber. In order to improve melt spinning conditions it is desirable to have an additive which has a melting temperature closer to that of polypropylene. It is also desirable to find other sources of dye enhancing additives which can be used for improving the dyeability of polypropylene.

I have now found that the dye acceptivity of crystalline polypropylene can be greatly enhanced by blending with the polypropylene prior to its formation into fiber a polyetherester which contains both ester and ether linkages in the main chain and is made by the self-condensation of a para(β-hydroxyalkoxy)benzoic acid. The alkoxy group in this hydroxycaboxylic acid can be either ethoxy or propoxy. The ethoxy compound is preferred. Surprisingly, the polyetherester-modified polypropylene exhibits better dyeing characteristics than either of the polypropylene or the polyetherester alone.

It is an object of this invention to provide a method of improving the dyeability of crystalline polypropylene. Another object is to provide a crystalline polypropylene polymeric blend which can be readily dyed. A further object is to provide fibers suitable to be manufactured into textile products which can be dyed by conventional dying steps without the necessity to pretreat the fiber itself. Other objects, advantages, and features of my invention will be apparent to those skilled in the art from the following disclosure and claims.

The polyetheresters which are used in forming the improved polypropylene blends are commercial products which can be manufactured as described in the patent to Cook et al., U.S. 2,471,023, which issued May 24, 1949. These polymeric linear etheresters are made by the self-condensation of a hydroxycarboxylic acid having the general formula

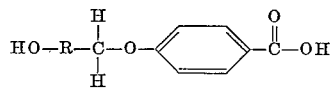

where R is an ethylene or methylene radical. It is preferred that the polyetherester be the self-condensation product of para(β-hydroxyethoxy)benzoic acid and have a melting point of 180 to 220° C., generally about 200 to 210° C.

The crystalline polypropylene is the commercial polypropylene widely used for the manufacture of textile fibers. By "crystalline" is meant that the polymer is substantially insoluble in boiling mixed xylenes at atmospheric pressure. As is well known, polypropylene melts over a temperature range of about 120 to 175° C., and the melting point is dependent to some extent on the sample preparation technique. The sample used in the present work had a melting point of 166° C. as determined on a differential scanning calorimeter (DSC) at a scanning rate of 10° C. per minute. The value given is that for the temperature at which the maximum rate of crystal melting is obtained.

The polyetherester is blended with the polypropylene in amounts of about 1 to 20 parts by weight of polyetherester per 100 parts of the polypropylene. For best dyeing results with a minimum of modification in the physical properties of the polypropylene, it is preferred to use from 5 to 15 parts of polyetherester per 100 parts of polypropylene. The polymers can be blended in any suitable manner such as by mixing together the polymers in powder, fluff, or pellet form, by ball milling, melt granulating or blending in a Banbury or on a roll mill. Preferably the polymers are melt blended at a temperature just sufficient to melt the polyetherester. The polymer blend is then melt spun using somewhat higher temperatures. The fibers can also be made by extrusion of the polymeric blend into a film which is then oriented and slit or fibrillated. The melt spun polypropylene fibers are stretched and oriented at temperatures of about 175 to 300° F. and at stretch ratios of about 1.5 to 1 to 20 to 1, preferably about 2 to 1 to 5 to 1.

The fiber products which are thus made are not homogeneous compositions, but contain minute fibrils of the polyetherester which separate from the polypropylene. This discontinuity of fiber structure, however, does not appear to adversely affect the physical properties of the polypropylene fiber. The fibers thus formed can be readily dyed with disperse dyes and the dyed fibers have been found to have good light-fastness and wash-fastness. By using the polyetherester made from para(β-hydroxyethoxy)benzoic acid to modify the polypropylene, the resin is more fluid under melt spinning conditions and more uniform dispersions can be obtained than when using polyester having a higher melting point. This is particularly advantageous in the manufacture of fine denier yarns. Also this polyetherester shows good resistance to acids and alkalis, and hence the modified polypropylene has good stability to laundering.

To further illustrate the advantages of this invention, the following example is presented:

EXAMPLE

Crystalline polypropylene having a melt flow of 12 (ASTM D–1238–62T, Condition L) was blended with 10 parts by weight per 100 parts of polypropylene of the self-condensation product of para($\beta$ - hydroxyethoxy) benzoic acid having a melting point of 210° C. In this blend were also incorporated 0.5 part by weight of 2(2-hydroxy-3,5-dioctylphenyl)-2,1,3-benzotriazole as a UV stabilizer and 0.05 part of 2,6-di-tert-butyl - 4-methylphenol, 0.1 part of di-n-octadecyl-3,5-di-tert-butyl-4-hydroxybenzyl phosphonate and 0.3 part of distearyl-thiodipropionate for thermal stabilization.

The polymers were blended and pelletized at 450° F. and then melt spun at 545° F. using an initial pack pressure of 810 p.s.i.g. and a throughput of 2 grams per minute per capillary with a 30 mil orifice diameter. The spun fibers were drawn at a ratio of 2.25 to 1 with the temperature of the first roll at 240° F. and the second roll 290° F. with a drawing speed of 500 meters per minute. Yarn was made from 16 filaments obtained from 2 plies of 8 filaments each, using two 8-hole spinnerets. The total filament denier was 288 and the drawn denier per filament was 18. A conventional antistatic lubricant was used for the yarn spin finish and the fiber was knitted into a fabric and dye-tested as shown in the following table:

TABLE I

| Run No. | Disperse Dye | Percent OWF [1] | YI [2] | Color Yield, K/S [3] | Washfastness [4] SA | SN | XeLF [5] | DC [6] | Gas Fading, GS/Cycles [7] | Crockfastness [8] Dry | Wet |
|---|---|---|---|---|---|---|---|---|---|---|---|
| 1 | Genacron Blue GR | 0.1 | 7.6 | 0.98 | 5 | 4–5 | 7–8/160 | 2–3 | 5/1 | 5 | 5 |
| 2 | do | 2.0 | 7.6 | 9.7 | 4–5 | 4–5 | 7/160 | 3 | 5/1 | 5 | 5 |
| 3 | Polydye Red BC | 0.1 | 7.6 | 0.70 | 5 | 5 | 7/160 | 2 | 5/1 | 5 | 5 |
| 4 | do | 2.0 | 7.6 | 10.3 | 5 | 4 | 6/80 | 2 | 5/1 | 5 | 5 |
| 5 | Foron Yellow SE-2GL | 0.1 | 7.6 | 2.7 | 5 | 4 | 5–6/80 | 2 | 5/1 | 5 | 5 |
| 6 | do | 2.0 | 7.6 | 15.1 | 5 | 1 | 7/160 | 1–2 | 4–5/1 | 4 | 4 |

[1] Dye initially in the dye bath calculated as weight percent of the fabric.
[2] Yellowness Index.—Determined on a Model LSD–1 Color Eye manufactured by Instrument Development Laboratories. Three readings were taken, X, Y and Z, and the index=100(X–Z)/Y. Lower numbers are better.
[3] Color yield measured on the Instrument Development Laboratories Model LSD–1 Color Eye. Reflectance (R) at the wavelength of maximum absorbance is measured and the K/S values are equal to (1–R)²/2R. Larger numbers represent better color yield.
[4] Washfastness is determined by AATCC Method II. Higher numbers are better in this and other AATCC tests.—SA=Shade alteration, or change, on washing; SN=Stain on nylon in multifiber after washing.
[5] Xenon light fastness, AATCC Method 16–1964 and 16E–1964T.
[6] Dry cleaning fastness, AATCC Method 85–1963.
[7] Gas fading, AATCC Method 23–1962.
[8] Crockfastness, AATCC Method 8–1961.

Yarn samples of 100 percent polypropylene (PP) and 100 percent of the self-condensation product of para($\beta$-hydroxyethoxy)benzoic acid (PEB) were also dye tested for color yield. The polypropylene yarn had 18 filaments and a total denier of 95. The PEB yarn had 24 filaments and a total denier of 50. The results compared with the polypropylene containing PEB (PP/PEB) are shown in the following table:

TABLE II

| Fiber | Disperse Dye | Percent OWF | Color Yield, K/S |
|---|---|---|---|
| PP/PEB | Genacron Blue GR | 2.0 | 9.7 |
| PP | do | 2.0 | 1.0 |
| PEB | do | 2.0 | 2.9 |
| PP/PEB | Polydye Red BC | 2.0 | 10.3 |
| PP | do | 2.0 | 0.9 |
| PEB | do | 2.0 | 4.0 |
| PP/PEB | Foron Yellow SE-2GL | 2.0 | 15.1 |
| PEB | do | 2.0 | 13.7 |

The above data demonstrate that the polypropylene having the polyetherester incorporated therein was greatly improved in its dye characteristics with the results comparing favorably with commercially acceptable dye modification techniques used for improving dyeability of crystal polypropylene fiber. The data of Table II show that the color yield for the PEB-modified polypropylene fiber was greater than for either the PEB or polypropylene alone.

Other variations and modifications of this invention will be apparent to those skilled in the art without departing from the spirit and scope of the invention.

I claim:
1. A polymeric blend comprising 100 parts by weight of crystalline polypropylene and 1 to 20 parts by weight of a polyetherester which is the self-condensation product of a hydroxy-carboxylic acid having the formula

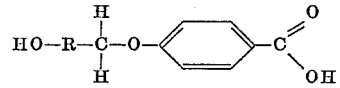

wherein R is a methylene or ethylene divalent radical.

2. The composition of claim 1 wherein the amount of polyetherester is in the range of 5 to 15 parts by weight per 100 parts of polypropylene.

3. The composition of claim 1 wherein the polyetherester is the self-condensation product of para($\beta$-hydroxyethoxy)benzoic acid, said polyetherester having a melting point of about 200 to 210° C.

4. Oriented fiber formed from the composition of claim 1.

5. Oriented fiber formed from the composition of claim 3.

6. Dyed, oriented fiber formed from the composition of claim 3.

7. A method of improving the dye receptivity of polypropylene which comprises blending therewith 1 to 20 parts by weight per 100 parts of crystalline polypropylene of a polyetherester which is the self-condensation product of a hydroxy-carboxylic acid having the formula

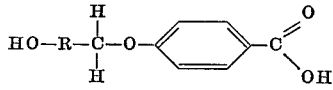

wherein R is a methylene or ethylene divalent radical.

References Cited

UNITED STATES PATENTS

| 3,312,755 | 4/1967 | Cappuccio et al. | 260—859 |
| 3,153,680 | 10/1964 | Giustiniani et al. | 260—874 |
| 2,471,023 | 5/1949 | Cook et al. | 260—78.3 |

MURRAY TILLMAN, Primary Examiner

C. J. SECCURO, Assistant Examiner

U.S. Cl. X.R.

8—55, 100; 260—45.8, 45.85, 45.95